US012623192B2

(12) United States Patent
NewDelman et al.

(10) Patent No.: US 12,623,192 B2
(45) Date of Patent: May 12, 2026

(54) PLUNGER MIXER DEVICE

(71) Applicant: SUB-MERGENT TECHNOLOGIES, INC., Lake Oswego, OR (US)

(72) Inventors: Mitchell J. NewDelman, Monte Carlo (MC); John A. Sanders, Austin, TX (US)

(73) Assignee: Sub-Mergent Technologies, Inc., Southlake, TX (US)

( * ) Notice: Subject to any disclaimer, the term of this patent is extended or adjusted under 35 U.S.C. 154(b) by 935 days.

(21) Appl. No.: 17/833,913

(22) Filed: Jun. 7, 2022

(65) Prior Publication Data

US 2023/0390721 A1 Dec. 7, 2023

(51) Int. Cl.
*B01F 27/2123* (2022.01)
*B01F 27/1143* (2022.01)
(Continued)

(52) U.S. Cl.
CPC ...... *B01F 27/2123* (2022.01); *B01F 27/1143* (2022.01); *B01F 27/806* (2022.01);
(Continued)

(58) Field of Classification Search
CPC ......... A01C 5/02; A01C 5/064; A01C 15/007; B01F 27/054; B01F 27/0541;
(Continued)

(56) References Cited

U.S. PATENT DOCUMENTS 2,984,462 A * 5/1961 O'Connor ........... B01F 27/1153 416/198 A
6,116,819 A * 9/2000 England .................. E21B 44/00 405/233
(Continued)

FOREIGN PATENT DOCUMENTS

CN 105993855 A * 10/2016 ............. A01C 23/04
CN 110476571 A * 11/2019
(Continued)

OTHER PUBLICATIONS

Spong, K. (Apr. 1, 2025). 1.3 Polygons—Definition, Types, Properties, Interactives and Examples. Flexbooks. <https://flexbooks.ck12.org/cbook/ck-12-interactive-geometry-for-ccss/section/1.3/primary/lesson/polygons-geo-ccss/ > (Year: 2025).*
(Continued)

*Primary Examiner* — Claire X Wang
*Assistant Examiner* — Patrick M Mccarty
(74) *Attorney, Agent, or Firm* — Brian S. Bailey

(57) ABSTRACT

Disclosed is a plunger mixer device (307B, 309B, 311B, and 313B) deployable within a hollow shaft injection drill bit system (305B). The plunger mixer device (307B, 309B, 311B, and 313B) includes a motor (313B), a piston (507D), and a plunger motor assembly (403C, 405C, 407C, 409C, 411C, 413C, and 415C). The motor (313B) is connected to a feeder auger tip. The piston (507D) is configured to be driven by the motor (313B). The piston (507D) is connected to a feeder auger (103C, 105A, 109B, and 205A). The plunger motor assembly (403C, 405C, 407C, 409C, 411C, 413C, and 415C) includes a stacked series of panels (503D, 505D, and 507D), and a plurality of motor shafts (311D). The stacked series of panels (503D), 505D, and 507D) has a plurality of ribbed panels (307D) with a rib locking feature. One of the stacked series of the panel (507C) is actuated by the motor (313B). The ribbed panels (303C) lock between each other when the ribbed panels (305D, 307B, 307D, and 309B) are spun into a fully formed deployment. The ribbed panels (303C, 305C, and 307C), upon deployment, serve to mix wet and dry materials by subsurface hollow shaft drilling augers (103A) ascending in communication with a feeder auger ascent and the subsequent descent.

16 Claims, 10 Drawing Sheets

(51) Int. Cl.

| | |
|---|---|
| ***B01F 27/806*** | (2022.01) |
| ***B01F 35/21*** | (2022.01) |
| ***B01F 35/214*** | (2022.01) |
| ***B01F 35/221*** | (2022.01) |
| *B01F 101/32* | (2022.01) |

(52) U.S. Cl.
CPC ........ *B01F 35/2112* (2022.01); *B01F 35/214* (2022.01); *B01F 35/221* (2022.01); *B01F 2101/32* (2022.01)

(58) Field of Classification Search
CPC ............. B01F 27/0542; B01F 27/0543; B01F 27/114; B01F 27/1141; B01F 27/1142; B01F 27/1143; B01F 27/1144; B01F 27/115; B01F 27/1151; B01F 25/7174; B01F 27/2123; E02D 5/22; E02D 5/56; E02D 5/801; F04D 3/02; F04D 7/045
See application file for complete search history.

(56) References Cited

U.S. PATENT DOCUMENTS

| | | | | | |
|---|---|---|---|---|---|
| 6,119,787 | A * | 9/2000 | Garcia | E21B 7/005 | 172/25 |
| 6,393,927 | B1 * | 5/2002 | Biggs | A01C 21/007 | 73/866 |
| 7,018,139 | B1 * | 3/2006 | Slemons | E02D 5/56 | 405/253 |
| 2003/0089525 | A1 * | 5/2003 | Sherwood | E21B 10/44 | 175/57 |
| 2004/0008574 | A1 * | 1/2004 | Aver | B01F 27/808 | 366/323 |
| 2010/0072123 | A1 * | 3/2010 | Haslem | G01D 5/145 | 210/232 |
| 2013/0272799 | A1 * | 10/2013 | Suver | E02D 5/56 | 405/233 |
| 2015/0345098 | A1 * | 12/2015 | Song | E02D 7/22 | 405/253 |
| 2017/0086349 | A1 * | 3/2017 | Tevs | A01C 7/203 | |
| 2019/0195788 | A1 * | 6/2019 | Liu | G01N 21/3554 | |
| 2021/0268456 | A1 * | 9/2021 | Swanson | B01F 23/59 | |
| 2021/0300227 | A1 * | 9/2021 | Ackerman | B60P 1/4471 | |
| 2022/0163436 | A1 * | 5/2022 | López-Cuervo Medina | A01B 79/005 | |
| 2022/0318974 | A1 * | 10/2022 | Petrany | G06T 7/33 | |
| 2024/0328421 | A1 * | 10/2024 | Khoshnevis | F04B 15/02 | |

FOREIGN PATENT DOCUMENTS

| | | | | | |
|---|---|---|---|---|---|
| CN | 110583445 | A | * | 12/2019 | A01C 23/042 |
| CN | 111183779 | A | * | 5/2020 | |
| CN | 111869555 | A | * | 11/2020 | A01C 5/04 |
| CN | 112219517 | A | * | 1/2021 | |
| CN | 114279948 | A | * | 4/2022 | |
| GB | 1270106 | A | * | 4/1972 | F04D 7/045 |
| KR | 102221273 | B1 | * | 3/2021 | |
| WO | WO-2016021780 | A1 | * | 2/2016 | E02D 5/54 |
| WO | WO-2020252780 | A1 | * | 12/2020 | A01B 79/00 |

OTHER PUBLICATIONS

Tracy, S. R., Black, C. R., Roberts, J. A., & Mooney, S. J. (2011). Soil compaction: a review of past and present techniques for investigating effects on root growth. Journal of the Science of Food and Agriculture, 91(9), 1528-1537. (Year: 2011).*

* cited by examiner

PLUNGER MIXER DEVICE

TECHNICAL FIELD

The present invention is generally related to a plunger mixer device. More particularly, the present disclosure relates to a plunger mixer device to expel constituents in a hollow shaft injection drill bit system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

With an expected world population of 9 billion by 2050, the need to produce more food and fiber is urgent. Irrigated agriculture is more productive, yet large amounts of water are required to maintain maximum yields. Agricultural science strives to improve irrigation management to minimize water inputs while optimizing crop productivity.

Innovative irrigation management could help avoid negative environmental and economic consequences of over- or under-irrigation. Under irrigation affects crop quality and yield. Over-irrigation increases topsoil erosion and the potential of property contamination due to chemical flows. Water resource depletion could consequently increase a region's susceptibility to drought. Non-optimal irrigation can provoke losses to growers, to the local community, and hence, food security.

European patent application EP1203522A1 filed by Hargreaves Jonathan William et al. discloses Ground injection, e.g., aeration, apparatus adapted to be mounted on or drawn by a tractor and comprising one or more tines reciprocated vertically by a crank and crankshaft-driven from a motor. Each tine defines an internal passage with outlet apertures. A piston rod connected to each tine and a cylinder have a piston that forces air into a reservoir and via a line into the passage. The mechanism is timed such that a pulse of air is injected into the ground through outlet apertures at the position of maximum penetration of the ground by each tine. Instead of air, a liquid or other gaseous substance may be injected into the ground where it is penetrated by each tine. The apparatus may include two or more rows of such tines and associated injection means.

A PCT application WO 2020/020890 A1 filed by Reid Brian J et al. discloses a solid dosage form comprising biochar and at least one pesticide and/or at least one antimicrobial, wherein said biochar and said at least one pesticide and/or said at least one antimicrobial is homogeneously mixed in said dosage form and said dosage form does not have a layered structure. The invention also provides a method for preparing the dosage form, a liquid composition comprising the dosage form, and a method of controlling pests using the dosage form.

However, none of these prior arts talk about targeted injection(s) at or below the horizon A and or below 30 cm from the surface.

This specification recognizes that there is a need for an efficient and cost-effective plunger mixer device to expel constituents in a hollow shaft injection drill bit system.

Thus, in view of the above, there is a long-felt need in the industry to address the aforementioned deficiencies and inadequacies.

Further limitations and disadvantages of conventional and traditional approaches will become apparent to one having skill in the art through comparison of described systems with some aspects of the present disclosure, as set forth in the remainder of the present application and with reference to the drawings.

SUMMARY OF THE INVENTION

A plunger mixer device is provided substantially, as shown in and/or described in connection with at least one of the figures, as set forth more completely in the claims.

An aspect of the present disclosure relates to a plunger mixer device deployable within a hollow shaft injection drill bit system. The plunger mixer device includes a motor, a piston, and a plunger motor assembly. The motor is connected to a feeder auger tip. The piston is configured to be driven by the motor. The piston is connected to a feeder auger. The plunger motor assembly includes a stacked series of panels and a plurality of motor shafts. The stacked series of panels has a plurality of ribbed panels with a rib locking feature. One of the stacked series of the panel is actuated by the motor. The plurality of motor shafts has variable lengths to hold the stacked series of panels. The ribbed panels lock between each other when the ribbed panels are spun into a fully formed deployment, wherein the ribbed panels, upon deployment, serve to mix wet and dry materials by one or more subsurface hollow shaft drilling augers ascending in communication with a feeder auger ascent and the subsequent descent.

In an aspect, the rib locking feature creates a reversible interlocking of the ribbed panels to form a functional plunger surface piece in a polygonal shape.

In an aspect, the ribbed panels have a length of either shorter than a radius distance of the polygonal shape and/or half of a diagonal distance of the polygonal shape of the hollow shaft or the length matching the radius distance and/or half of the diagonal distance of the polygonal shape of the hollow shaft.

In an aspect, the ribbed panels include one or more of a plurality of apertures; and a plurality of perforations to facilitate one or more of mixing and entrainment, wherein the plurality of perforations comprising one or more tines configured to facilitate the mixing of abrasives.

In an aspect, the plurality of perforations are sequential in a pattern or irregular to enable one or more of mixing; and entrainment.

In an aspect, the plunger mixer device further comprises one or more AI robots to monitor the depth of the hollow shaft injection drill bit system, wherein the AI robot calculates the resistance by the drill time to achieve the depth.

In an aspect, the AI robots comprise a camera to compute the rib panels and determine depth, wherein the camera enables the AI robots to compute a plurality of revolutions to determine the activation of the plunger mixer device.

In an aspect, the plunger mixer device further comprises a plurality of sensors to measure revolutions connected to a lead screw and the plurality of sensors to measure distance traveled connected to a drilling platform, and one or more microcontrollers and a computer satellite dish (for cloud computing) to trigger the motor and measure the distance traveled.

In an aspect, the sensors are configured to determine depth.

In an aspect, the sensors are in communication with a plurality of prescription of constituents at different depths lateral perforations to then command the deployment of the plunger mixer device and/or the plunger mixer device to mix and/or entrain.

In an aspect, the plurality of prescription of constituents stored in the one or more microcontrollers.

In an aspect, the sensors measure soil's moisture and detect or references a ternary database of a soil type to determine the deployment of the plunger mixer device.

In an aspect, the sensors transmit the measured data to the one or more microcontrollers.

In an aspect, the sensors dynamically provide feedback on one or more levels of constituents, nutrients, and or trace elements present in the soil and their levels at specific depths to the one or more processors, and the one or more microcontrollers.

In an aspect, the motor has a variable speed depending on the one or more constituents, wherein the variable speed creates entrainment of the one or more constituents.

In an aspect, the levels of constituents, nutrients, and or trace elements are mixed within the hollow shaft by the plunger mixer device.

In an aspect, the plunger mixer device spins in one or more directions including one or more of the same direction of the feeder auger, an opposite direction of the feeder auger; and the same or opposite direction while the feeder auger remains still.

In an aspect, the plunger mixer device deploys one or multiple times upon the ascent of the hollow shaft injection drill bit system to push the material out of the hollow shaft injection drill bit system.

In an aspect, the hollow shaft injection drill bit system descends then ascends and plunger mixing and/or entrainment of the constituents is accomplished by deployments of one or more subsurface hollow shaft drilling augers.

Optimally efficient irrigation is a function of soil water status across the root zone. Prescribed soil amendment materials, either organic/in-organic and/or non-organic matter, can be injected either for soil health or for water retention.

Accordingly, one advantage of the present invention is that it injects down to various targeted root zone sections and/or at sub-rootzone soil horizons for soil health and hence enhanced yield and/or water retention modification for drought resilience.

Further, soil amendments applying biochar of many varieties have been examined for crop yield and quality as well as for regulating nitrogen level imbalances due to increased fertilizer use.

It is known that locally produced biochar can improve the physical condition of light-textured soils important for crop growth through increased soil aggregate stability, porosity, and available water contents where it reduced soil bulk density. Reduced bulk density due to soil aggregation may aid root growth with more water available. Biochar application to highly weathered and sandy soils will, therefore, increase the soils' resilience against drought depending upon the physical properties of the selected biochar.

Accordingly, one advantage of the present invention is that it facilitates access to sub-root zone horizons as potential massive carbon sinks for certifiable carbon sequestration.

There is an ever-increasing array of discrete amendments being tried to enhance soil health and/or productivity at the surface or near-surface soil horizons, as well as some rudimentary soil health amendment spiking of soils.

When referencing biochar or other soil amendment application rates, the literature discusses topsoil spreading and sometimes mechanical blending down as far as 30 centimeters with surface disruption; but we have found no reference to targeted release through injection at and below the root zone with minimal surface disruption.

As far as it can be determined from known background about existing methods, processes, techniques, or equipment, the present invention provides targeted push release dispensing of any material including live material by way of example but not limited to microbes, larva, and fungi, using a layer of cushioned liquid.

An example is the vertical or lateral ejection of earthworms and or larva anywhere below the surface. For injection of earthworms or larva below 180 cm, the present invention provides an ability to inject specific organisms by way of example but not limited to anecic larva or earthworms. This ecotype of earthworms is the only ones capable of influencing soil geometry at deeper levels, by creating vertical burrows (i.e., bio-pores up to 2 m in depth). Bouché and Al Addan (1997) reported a significant increase in water percolation as a direct influence of the presence of anecic earthworms across a range of soil systems. Soil biology and biochemistry pages 441-452.

Accordingly, one advantage of the present invention is that it injects liquid or treated constituent carriers at variable depths ideal to that constituent and the soil.

Accordingly, one advantage of the present invention is that it creates bio-colonies at specific depths and diameters of dispersal.

Accordingly, one advantage of the present invention is that it de-compacts the soil sub-surface by injection of gas and or sonic waves.

While the current use of the invention is in the field of sub-surface soil sequestration and or amendment, there are other uses for the invention some of which are as follows.

Soils need materials that may be in a live state, dry, damp, liquid, or slurry state. Beyond earthworms, most soil organisms cannot grow outside of the soil, so it is necessary to preserve healthy and diverse soil ecosystems to preserve beneficial microorganisms. Estimated numbers of soil species include 30,000 bacteria; 1,500,000 fungi; 60,000 algae; 10,000 protozoa; 500,000 nematodes; and 3,000 earthworms (Pankhurst, 1997).

Dead, damaged, depleted, and even some healthy soils require interventions to be farmed. Because agriculture ecosystems have reduced structural and functional diversity, they have less resilience than natural systems (Gleissman, 1998). The expected outputs from the system (yield) cannot be sustained without human inputs, therefore humans are an integral part of agriculture ecosystems.

These features and advantages of the present disclosure may be appreciated by reviewing the following description of the present disclosure, along with the accompanying figures wherein like reference numerals refer to like parts.

BRIEF DESCRIPTION OF DRAWINGS

The accompanying drawings illustrate the embodiments of systems, methods, and other aspects of the disclosure. Any person with ordinary skills in the art will appreciate that the illustrated element boundaries (e.g., boxes, groups of boxes, or other shapes) in the figures represent an example of the boundaries. In some examples, one element may be designed as multiple elements, or multiple elements may be designed as one element. In some examples, an element shown as an internal component of one element may be implemented as an external component in another and vice versa. Furthermore, the elements may not be drawn to scale.

Various embodiments will hereinafter be described in accordance with the appended drawings, which are provided to illustrate, not limit, the scope, wherein similar designations denote similar elements, and in which.

DETAILED DESCRIPTION

Figure 1A:
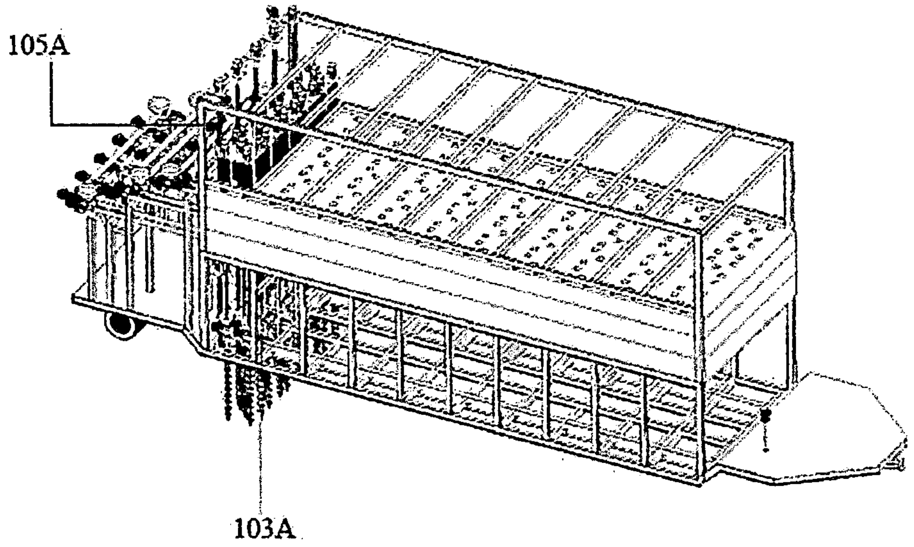
FIG. 1A illustrates a view of an exemplary injection drilling trailer with detail of an array of a feeder auger assembly, in accordance with at least one embodiment.

The present disclosure is best understood with reference to the detailed figures and description set forth herein. Various embodiments have been discussed with reference to the figures. However, those skilled in the art will readily appreciate that the detailed descriptions provided herein with respect to the figures are merely for explanatory purposes, as the methods and systems may extend beyond the described embodiments. For instance, the teachings presented and the needs of a particular application may yield multiple alternative and suitable approaches to implement the functionality of any detail described herein. Therefore, any approach may extend beyond certain implementation choices in the following embodiments.

References to “one embodiment,” “at least one embodiment,” “an embodiment,” “one example,” “an example,” “for example,” and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase “in an embodiment” does not necessarily refer to the same embodiment.

Methods of the present invention may be implemented by performing or completing manually, automatically, or a combination thereof, selected steps or tasks. The term “method” refers to manners, means, techniques, and procedures for accomplishing a given task including, but not limited to, those manners, means, techniques, and procedures either known to, or readily developed from known manners, means, techniques and procedures by practitioners of the art to which the invention belongs. The descriptions, examples, methods, and materials presented in the claims and the specification are not to be construed as limiting but rather as illustrative only. Those skilled in the art will envision many other possible variations within the scope of the technology described herein.

The invention disclosed and taught herein is directed to a connected, and deployable plunger mixer device of any polygonal shape for a hollow shaft injection drill bit system that includes a piston which may be part of an attached feeder auger driven by a motor connected at the feeder auger tip having a stacked series of panels that are actuated by a motor and possessing an inter panel rib locking feature. The motor shafts have an extension beyond their casing, which holds the ribbed panels. The ribbed panels lock between each other when the panels are spun into a fully formed deployment. Upon deployment, these panels could also serve to mix wet and dry materials by the drilling auger ascending in communication with the feeder auger ascent and the subsequent descent.

According to a first embodiment of the present invention, it provides those inputs by the expulsion of materials out of the hollow shaft of the injection drill bit.

According to a second embodiment of the present invention, it provides those inputs by enabling the cleaning of the residues inside and or attached to the walls of the hollow shaft of the injection drill bit.

According to a third embodiment of the present invention, it enables in a stacked state the feeder auger materials to pass into the hollow shaft of the injection drill bit.

According to a fourth embodiment of the present invention, it provides those inputs by enabling flat pressure for live visible bio-logic forms to be expelled safely from a hollow shaft of the injection drill bit.

According to a fifth embodiment of the present invention, it provides those inputs by enabling the mixing of dry materials together by holding the dispensed material in place then opening the rib panels back to a stacked position, then redeploying the interconnected panels and allowing them to deploy ascending down to mix the materials.

According to a sixth embodiment of the present invention, it provides those inputs by enabling the mixing of wet materials together by holding the dispensed material in place then opening the rib panels back to a stacked position, then redeploying the interconnected panels and allowing them to deploy ascending down to mix the materials.

According to a seventh embodiment of the present invention, it provides those inputs by enabling the mixing of wet and dry materials together by holding the dispensed material in place then opening the rib panels back to a stacked position, then redeploying the interconnected panels and allowing them to deploy ascending down to mix the materials.

According to an eighth embodiment of the present invention, it provides those inputs through enabling the holding of matter, and or organisms animate or inanimate for a time interval or an achieved a targeted depth before retracting and subsequent dispensing.

According to the ninth embodiment of the present invention, it enables injection and or sequestration of carbon.

According to a tenth embodiment of the present invention, it enables the universal aim to increase the global inventory of arable land with appropriate porosity Constituents prescriptive for its ternary type. Porosity modification is a function of the shape and size of solid Constituents such as but not by way of limitation, aggregates affecting the Bulk Mass Density of the targeted Horizon. Likewise living constituents such as but not by way of limitation, aneic earthworms can improve porosity by penetrating below Horizon A.

Other embodiments may result from the teaching of the present invention disclosed and taught herein Specifically, this continuation of intellectual property discloses an unassembled downhole piston-like reciprocating part moving within the hollow stem of an injection drill bit.

The stacked panels of the invention are most often located at the tip of the feeder auger flight but could be anywhere along with such flight.

The assembly and retraction of the part or panel may be triggered by a sequence of events, or by transmission from an AI robotically, computer, PLC, or sensor.

The assembly and retraction of the part or panel may be triggered at or within multiple strata zones and or times within an injection operation.

Assembly is accomplished by a motor turning on and rotating the stacked panels into place.

The stacked panels have a rib feature that creates a reversible interlocking of the panels to form a functional plunger surface piece in a polygonal shape.

The assembled unit can enable lateral and vertical ejection of the hollow stem materials which inject into the subsurface soils.

In the case of in-situ constituents, the invention can clear the sidewalls of slurry and or caked material enabling the efficacy of dosing and maximizing the quantity of injectable constituents.

Definitions

"Abrasives": means any constituent capable of inhibiting smearing. By way of example but not limited to abrasives include walnut shells, pecan shells, and corn stover.

"Actuated": A device that causes a machine or other device to operate by way of example but not limited to a gate or valve opening or closing.

"Actuated Plunger Closure": Reverse motion triggered by an AI robotically, computer, PLC, and or sensor to disassemble and stack the rib panels.

"Amendment Material": can also mean Constituents and or when used herein means any substance known to render a productivity advantage or benefit to sub-optimal soils and/or which provides any remediation benefit to such soils; and includes any biochar, compost, bacterial humus, and soil nutrients, fertilizers and fungi, particularly mycorrhizal fungi and mycorrhizal spores.

"Antimicrobial": is an agent that kills micro-organisms or stops their growth. Antimicrobials can be grouped according to the microorganisms they act primarily against. For example, antibiotics are used against bacteria, and antifungals are used against fungi.

"Baits": Any agent that attracts a pest or an unwanted organism. By way of example and not meant to be limiting, Baits for insects are often food-based baits and are an effective and selective method of insect control. Typically, a bait consists of a base material called a carrier (often grain or animal protein) plus a toxicant (most often insecticides by way of example but not limitation organophosphates, carbamates, or pyrethroids) and sometimes an additive (usually oil, sugar or water) to increase attractiveness. The toxicant part of bait can also be biological rather than chemical. Examples of biological toxicants are *Bacillus thuringiensis* (Bt), parasitic nematodes, and fungi. Many baits are not highly attractive to the insect but instead function as an arrestant. Baits for rodents are generally cereal-based and made of grains such as oats, wheat, barley, corn, or a combination thereof. Formulations may also contain other ingredients such as adherents to bond the toxicant to the grain particles.

"Ball Screw": A high-efficiency feed screw with the ball making a rolling motion between the screw axis and the nut. Compared with a conventional sliding screw, this product has drive torque of one-third or less, making it most suitable for saving drive motor power.

"Chemical": Means a compound or substance that has been purified or prepared, especially artificially for purposes of sub-surface amendment, by way of example but not a limitation; fertilizers, sorption materials like zeolites, fungicides, herbicides, and insecticides. A chemical can mean any basic substance which is used in or produced by a reaction involving changes to atoms or molecules by way of example but is not limited to any liquid, solid, or gas.

"Colloids": are uniform mixtures that don't separate or settle out. While colloidal mixtures are generally considered to be homogeneous mixtures, they often display heterogeneous quality when viewed on the microscopic scale. There are two parts to every colloid mixture: the particles and the dispersing medium. The colloid particles are solids or liquids that are suspended in the medium. These particles are larger than molecules, distinguishing a colloid from a solution. However, the particles in a colloid are smaller than those found in a suspension. In smoke, for example, solid particles from combustion are suspended in a gas. Examples of colloids include by way of examples but are not limited to the following fog, smoke, and foam.

"Constituent": Any soil amendment material by way of example but not limitation aggregate, amendments, minerals, lime, calcium, calcium carbonate, abrasives, antimicrobials, baits, bio-char, biologicals, bio-mass, carbon including activated, chemicals, colloids, compost, eco colonies, precursors to the eco colony, living organisms, inoculants, gas or any other material that can be injected subsurface to change the soil composition and or temperature. Constituents can mean chemical pesticides or natural biologicals for unwanted pests. Solid Constituents can be any polygonal shape, by way of example but are not limitation fines, granules, pellets, briquettes, blocks, or larger fragments that can fit inside and be ejected from a hollow shaft drill bit. Colloids regardless of phase state are considered constituents. Constituents can contain doses of other constituents. Constituents also include Sorption or Sorbents materials.

"Copper Bands": The windings are flat copper strips to withstand the Lorentz force of the magnetic field. Electricity in the wire passes into the slip ring to make it into a magnet. A copper band includes any conductive material or alloy.

"Coupling, Gear Box Couplings, Gear Box Disc Coupling": Transmit torque from a driving to a driven bolt or shaft tangentially on a common bolt circle. Gear Box couplings are designed to transmit torque between two shafts that are not collinear. They typically consist of two flexible joints—one fixed to each shaft—which are connected by a spindle, or third shaft. A flange within the drawings below or at the top of a gearbox is Disc Couplings.

"Damping": Can refer to the equipment platform, where the substrate is materials by way of example but not limitation granite or plastics that have tensile strength for mounting but have properties to damp vibration and or torque.

"Density": Bulk density, also called apparent density or volumetric density, is a property of powders, granules, and other "divided" solids, especially used in reference to mineral components (soil, gravel), chemical substances.

"Eco Colony": Any subsurface space that is created by the injection of preferred constituents as established or precursor natural habitat for any specific desirable living organism.

"Eco Colony Pre Cursors": Injected subsurface Eco Colony habitat that is not populated by inhabitant colony.

"Encoders": Encoders are used in machinery for motion feedback and motion control. Encoders are found in machinery in all industries. Encoders (or binary encoders) are the combinational circuits that are used to change the applied input signal into a coded format at the output. These digital circuits come under the category of medium-scale integrated circuits. In our case, they assist in-depth assessment and or achievement. Encoders through communication with PLC, Computer, or AI robotics and other interactive devices can trigger drilling platform ascent or descent or deployment and or retraction stacking of plunger. Depth achievement can trigger dispensing, plunger instructions, reamer wings, continued drilling or ascent, and then descent or repetition of these actions.

"Fastener Ring": A ring feature as part of the plunger panel that holds plunger panels shut-stacked, deployed, or in the right position and attached to the motor shaft.

"Feeder Auger": Examples of feeder augers that feed the materials to the drilling auger or its drilling inner tube, include augers with ribs, feeder flexible conveyor flight screws, flexible conveyor flight beveled round wire screws, flexible conveyor flight beveled square wire screws, flexible conveyor flight beveled wire screws, and flexible conveyor flight flat wire screws.

"Feeder Auger Plunger" or "Feeder Auger Stopper": Examples include AI Robotically, Computer, PLC, and or Sensor deployed actuation or retraction of a series of rib panels at the end of a motor shaft connected to the tip of a feeder auger.

"Flange": A projecting flat rim, collar, or rib on an object, serving to strengthen or attach. A flange is a rib or rim for strength, for guiding, or for attachment to another object. Where a flange appears in a drawing associated with a hollow shaft injection drill bit can also mean a Gear Box Coupling and or Gear Box Disc Coupling.

"Flexible Conveyor Flight Beveled Round Wire Screws": For applications where material flow is typically semi-free flowing to sluggish flowing, and material characteristics are highly abrasive, granular, flake, pellet, or irregular shape; the round bar wire screw provides excellent conveying of materials by way of example but not limitation: fine granules, zeolites, small bean-like pellets, and polymer regrind.

"Flexible Conveyor Flight Beveled Square Wire Screws": For applications where the material flow can be free-flowing, semi-free flowing, or sluggish, and material characteristics are highly abrasive, with high bulk density; the square bar wire screw provides highly efficient conveying of materials by way of example but not limitation: sand, heavy density powders, and large biochar.

"Flexible Conveyor Flight Beveled Wire Screws": For applications where material flow is typically semi-free flowing to sluggish flowing, and material characteristics are sticky, with tendencies to pack, smear, cake, or crumble; the beveled wire screw may have a wide-face design for conveying of materials by way of example but not limitation: iron oxide, zinc oxide, powders, and carbon black.

"Flexible Conveyor Flight Flat Wire Screws": For applications where material flow is typically free-flowing to semi free-flowing, and material characteristics are lightweight, highly aerated, powdered, or fluidizing; the flat wire screw may have a wide-face design for conveying of materials by way of example but not limitation: calcium carbonate, fumed silica, and biochar fines.

"Gear Box": The gearbox is a mechanical device used to increase the output torque or to change the speed (RPM) of a motor. The shaft of the motor is connected to one end of the gearbox and through the internal configuration of gears of a gearbox, provides a given output torque and speed determined by the gear ratio.

"Hollow Shaft": Any injection auger and or drill bit space between the walls, space may be cylindrical or any polygonal shape.

"Hollow Shaft of Injection Drilling Auger": A corkscrew and has multiple parts: collar, bottom aperture, window aperture, spillway, perforations, panels, screw, spurs, cutting edges, twist, shank, and in some cases a tang. Expansive auger bits have adjustable blades with cutting edges and spurs that can be extended radially to cut large holes.

"Hollow Shaft Injection Drilling Bit": Auger bits have adjustable blades with cutting edges and spurs that can be extended radially to cut large holes.

"Hollow Shaft Injection Drill Bit Screw Rib": Any rib on the side of the shaft of an auger drill bit or any drill bit.

"Hopper": A container for bulk material such as injectable Constituents, typically one that tapers downward and can discharge its contents at the bottom or a side panel.

"Injection Drilling Bit": A bayonet, flat, impregnated head, screw, auger, fish tail, or any shape that can penetrate the subsurface of land; or bed or basement below water. Any hollow shaft device of any polygonal width or diameter that is capable of penetrating ice, soil, rock, and or mineral.

"Injection Drill Bit Auger Extension": A connection segment for devices used in sub-surface operations. Some examples are Windows, Apertures, and Wings. Any hollow shaft device of any polygonal width or diameter that is capable of penetration of ice, soil, rock, and or mineral.

"Injection Drill Bit Screw": A tapered shape drilling bit or cylindrical shape with threads like a screw, with or without perforations.

"Inoculants": A constituent (a virus or toxin or immune serum) that is introduced into the subsurface of soil to produce or increase immunity to an undesirable living organism.

"Lead Screw": A threaded rod that drives the platform tool carriage in a drill or drilling array when subsurface drilling. Lead Screw can also be a Ball Screw, Worm Screw or Worm Gear.

"Limit Switch": a switch preventing the travel of an object in a mechanism past some predetermined point, mechanically operated by the motion of the object itself. Limit switches are found in machinery in all industries. In this application assist in communicating depth achievement for ascent or descent communicating to PLC, Computer, or AI robotics and other interactive devices. Depth achievement can trigger dispensing, plunger instructions, reamer wings, continued drilling or ascent, and then descent or repetition of these actions. A limit switch can refer to a plurality.

"Living Organisms": An individual form of life, by way of example but not limitation bacterium, protist, fungus, plant, or animal, composed of a single cell or a complex of cells in which organelles or organs work together to carry out the various processes of life, including in some circumstances virus.

"Magnetic Metals": Include ferromagnetic metals by way of example but not limited to iron, nickel, cobalt, gadolinium, dysprosium, and alloys by way of example but not limitation steel that also contain specific ferromagnetic metals such as iron or nickel.

"Minerals": A solid chemical compound with fairly well-defined chemical composition and a specific crystal structure that occurs naturally in pure form.

"Motor Housing Shaft" or "Motor Shaft": A cylindrical shaft transmits mechanical power.

"Motor" or "Plunger Motor": An AC or DC power unit that develops energy or imparts motion through a shaft.

"Organic Matter": Organic matter, organic material, or natural organic matter refers to the large source of carbon-based compounds found within natural and engineered, terrestrial, and aquatic environments. It is matter composed of organic compounds that have come from the feces and remains of organisms such as plants and animals. In soils, dead matter makes up roughly 85% of the organic matter. Organic matter includes dead matter, living microbes, and living parts of plants (e.g., roots). Organic Matter includes the four basic types pure substance that cannot be broken down into other types of substances; lipid organic compound such as fat or oil; matter anything takes up space and has mass; monosaccharide simple sugar such as glucose that is a building block of carbohydrates; nucleic acid organic compound such as DNA or RNA; nucleotide.

"Perforation": Any polygonal shape that is a hole within a shaft, collar, guard, or tube. Perforations enable dispensing, injection and ejection of constituents both vertically and laterally.

"Polygon": a plane figure with at least three straight sides and angles, and typically five or more.

"Porosity Soil or Soil Porosity": refers to the quantity of pores, or open space, between soil particles. Pore spaces may be formed due to the movement of roots, worms, and insects; expanding gases trapped within these spaces by groundwater; and/or the dissolution of the soil's parent material. Soil texture can also affect soil porosity. There are three main soil textures: sand, silt, and clay. Sand particles have diameters between 0.05 and 2.0 mm (visible to the naked eye) and are gritty to the touch. Silt is smooth and slippery to the touch when wet, and individual particles are between 0.002 and 0.05 mm in size. Clay is less than 0.002 mm in size and is sticky when wet. The differences in the size and shape of sand, silt, and clay influence the way the soil particles fit together, and thus their porosity.

"PLC": A programmable logic controller (PLC) is a small, modular solid-state computer with customized instructions for performing a particular task. PLCs, which are used in industrial control systems (ICS) for a wide variety of industries, have largely replaced mechanical relays, drum sequencers, and cam timers. PLCs are used for repeatable processes and have no mechanical parts and they can gather information from sensors. Can also mean an AI Robotically, Computer, PLC, and or Sensor.

"Plunger Panel": A segment of the Plunger that has a rib that when deployed can interconnect with the next Plunger Panel.

"Plunger Panel Rib": A feature on the edge of the Plunger Panel that is a protrusion that when deployed can interconnect with the next Plunger Panel.

"Subsoil": is the layer of soil below the topsoil. The layer of soil closest to our feet is topsoil. Geologists refer to it as the "A" horizon, whereas subsoil is the "B" horizon. Topsoil is much more fertile than subsoil because it contains more organic matter, thus giving it a darker color. As per the soil profile, this is a kind of soil that lies below the surface soil but above the bedrocks. It is also called undersoil or B Horizon soil. It lies between C Horizon and E Horizon. The B Horizon predominantly consists of leached materials as well as minerals such as iron and aluminum compounds. Living Organisms aid Horizon A fertility but these organisms because of Porosity spend very little time below Horizon A.

"Slip Ring or Slip Ring Bore Hole": a ring in a dynamo or electric motor which is attached to and rotates with the shaft, passing an electric current to a circuit via a fixed brush pressing against it. A Slip Ring with a hollow shaft creates a borehole for an injection drill bit shaft.

"Sorption or Sorbents" Are Constituents capable of adsorbing/absorbing one or more constituents in gas, fluid, liquid, or a mixture thereof. Examples include activated carbon, atomic particles, biochar, carbon materials, activated carbon, carbon nanotubes, catalysis, graphene, metal hydrides, nanoparticles, nanostructured materials, polymeric organic frameworks, silica, silica gel, clay, zeolites, other adsorbents/absorbents, or combination thereof. Useful adsorbents/absorbents, such as carbon materials, have high surface areas and a high density of pores with optimal diameter. Sorption or Sorbents can be different types of activated charcoal and zeolites. Sorption or Sorbents may also be combinations that vary by type(s) of metal ions and/or organic material(s) used, and may be made in molecular clusters or molecular chains to obtain the desired quality, i.e. type of adsorption/absorption, and volume capacity in terms of the desired porosity. Examples of Sorption or Sorbents also include constituents such as but are not limited to Bio-Char and Zeolites.

"Suspended": Suspended is defined as suspension which is a heterogeneous mixture in which the solute particles do not dissolve but get suspended throughout the bulk of the medium. Emulsions are a type of suspension, where two immiscible liquids are mixed together. Any constituents that are liquid or particle held in suspension.

"Suspensions": An emulsion is a suspension of two liquids that usually do not mix together. These liquids that do not mix are said to be immiscible. An example would be oil and water.

"Worm Screw and Worm Gear": Used to transmit motion and power when a high-ratio speed reduction is required. Worm Screws and Worm Gears accommodate a wide range of speed ratios.

"Zeolites": Any of various hydrous silicates that are analogous in composition to the feldspars, occur as secondary minerals in cavities of lavas, and can act as ion-exchangers. Any of various natural or synthesized silicates of similar structure are used especially in water softening and as adsorbents and catalysts. Zeolites offer the capability of salinity and boron remediation. Clinoptilolite (a naturally occurring zeolite) is used as a soil treatment in agriculture. It is a source of potassium that is released slowly. They can adsorb effluent and ammonia, and subsequently be used as soil nutrients.

Figure 1B:
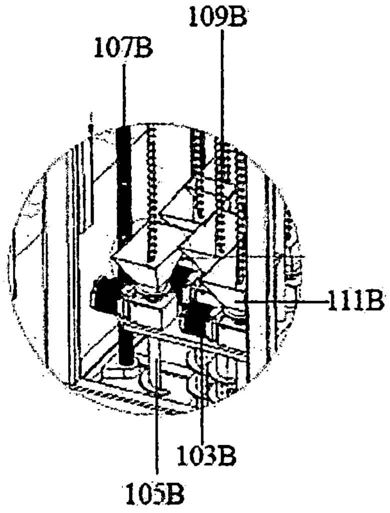
FIG. 1B illustrates a view of an exemplary close-up of FIG. 1A (103A) shows a constituent hopper, gearbox, motor, and auger, in accordance with at least one embodiment.
Figure 1C:
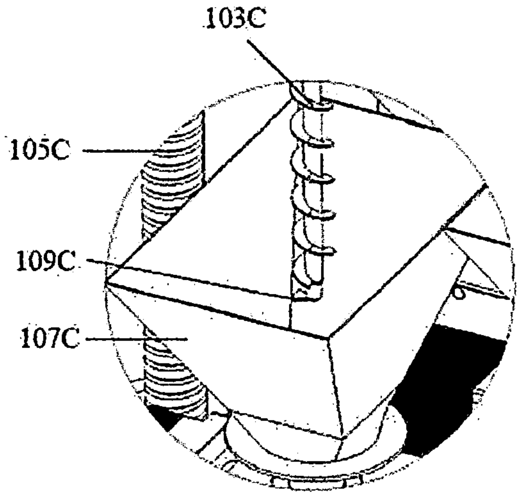
FIG. 1C illustrates a view of an exemplary close-up of FIG. 1B (107B) shows a constituent hopper, flange, vertical platform control screw, and auger, in accordance with at least one embodiment.

FIG. 1A illustrates a view of an exemplary injection drilling trailer with detail of an array of a feeder auger assembly, in accordance with at least one embodiment. FIG. 1B illustrates a view of an exemplary close-up of FIG. 1A (103A) shows a constituent hopper, gearbox, motor, and auger, in accordance with at least one embodiment. FIG. 1C illustrates a view of an exemplary close-up of FIG. 1B (107B) shows a constituent hopper, flange, vertical platform control screw, and auger, in accordance with at least one embodiment. FIG. 1A depicts a sub-surface hollow shaft drilling auger (103A), and feeder augers for subsurface hollow shaft drilling augers (105A). FIG. 1B depicts a sub-surface hollow shaft drilling auger motor (103B), sub-surface hollow shaft drilling augers (105B), subsurface hollow shaft drilling augers platform lead screw (107B), feeder augers (109B), and a hopper (111B). FIG. 1C depicts a feeder auger (103C), subsurface hollow shaft drilling augers platform lead screw (105C), a hopper (107C), and a non-deployed feeder auger plunger (109C).

Figure 3A:
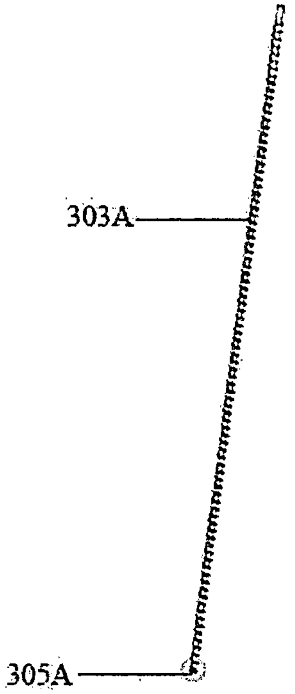
FIG. 3A illustrates a view of an exemplary hollow stem feeder auger with a stopper component, in accordance with at least one embodiment.
Figure 3B:
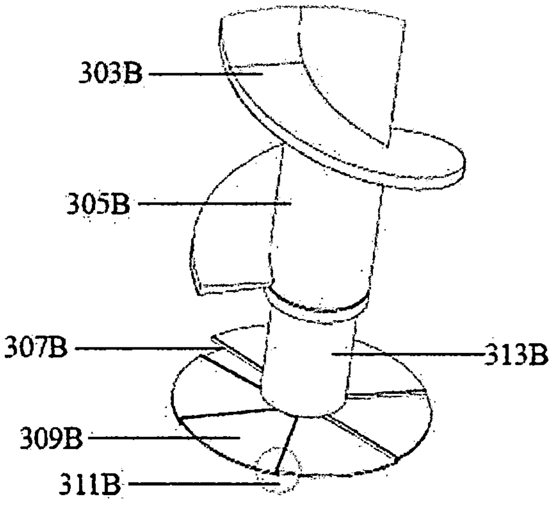
FIG. 3B illustrates a close-up view of FIG. 3A (305A) an exemplary feeder auger stopper panels fully deployed, in accordance with at least one embodiment.
Figure 3C:
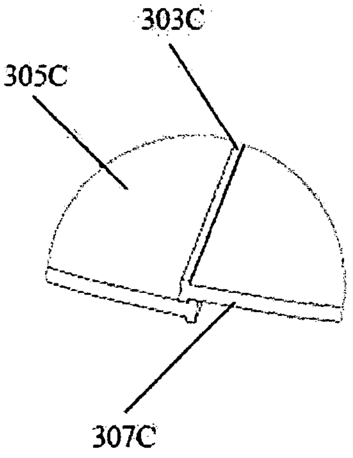
FIG. 3C illustrates a view of an exemplary bottom of the panel not attached to the motor showing ribs at the perimeter length end, in accordance with at least one embodiment.
Figure 3D:
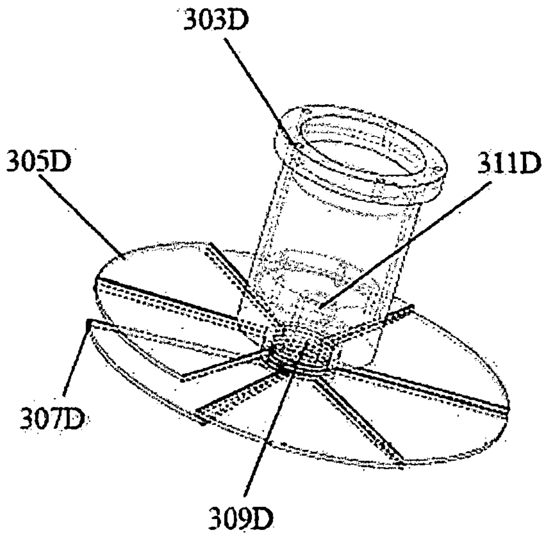
FIG. 3D illustrates an exploded view of an exemplary bottom of the panel attached to the motor and other panels showing ribs at the perimeter length ends, in accordance with at least one embodiment.

FIG. 3A illustrates a view of an exemplary hollow stem feeder auger with a stopper component, in accordance with at least one embodiment. FIG. 3B illustrates a close-up view of FIG. 3A (305A) an exemplary feeder auger stopper panels fully deployed, in accordance with at least one embodiment. FIG. 3C illustrates a view of an exemplary bottom of the panel not attached to the motor showing ribs at the perimeter length end, in accordance with at least one embodiment. FIG. 3D illustrates an exploded view of an exemplary bottom of the panel attached to the motor and other panels showing ribs at the perimeter length ends. So, when the bottom panel rotates and engages with the rib of the next panel, the next-in-line panel will rotate with the bottom panel. All the panels will retract when reversed. FIG. 3A depicts a Shaft of Hollow Feeder Auger (303A), and a call out for close up of FIG. 3B (305A). FIG. 3B depicts a Feeder Auger Rib (303B), a hollow feeder auger shaft (305B), a plunger panel rib in an un-locked position (307B), plunger panel (309B), call-out for close up in FIG. 3C a stopper or plunger panel rib in a locked position (311B), and plunger motor (313B). FIG. 3C depicts a plunger panel rib (303C), the top of a flat plunger panel (305C), and a perimeter depth of the panel (307C). FIG. 3D depicts a flange of the motor housing (303D), a plunger panel (305D), a plunger panel rib (307D), a ring fastener plunger panel (309D), and a motor housing shaft interface to plunger panels (311D).

The plunger mixer device (307B, 309B, 311B, and 313B) is deployable within a hollow shaft injection drill bit system (305B). The plunger mixer device (307B, 309B, 311B, and 313B) includes a motor (313B), a piston (507D) (shown in FIG. 5D), and a plunger motor assembly (403C, 405C, 407C, 409C, 411C, 413C, and 415C) (shown in FIG. 4C). The motor (313B) is connected to a feeder auger tip.

In an embodiment, the motor (313B) has a variable speed depending on the one or more constituents, wherein the variable speed creates entrainment of the one or more constituents. In an embodiment, the levels of constituents, nutrients, and or trace elements are mixed within the hollow shaft by the plunger mixer device (307B, 309B, 311B, and 313B). Nutrients or micronutrients (sometimes also called trace elements) are essential plant nutrients required in very small amounts to sustain plant growth and development, especially in enzyme systems related to photosynthesis and respiration. The main essential elements in this group usually include boron, chlorine, copper, iron, manganese, molybdenum, nickel, and zinc.

In an embodiment, the plunger mixer device (307B, 309B, 311B, and 313B) spins in one or more directions including one or more of the same direction of the feeder auger, an opposite direction of the feeder auger; and the same or opposite direction while the feeder auger remains still.

In an embodiment, the plunger mixer device (307B, 309B, 311B, and 313B) deploys one or multiple times upon the ascent of the hollow shaft injection drill bit system (305B) to push the material out of the hollow shaft injection drill bit system (305B). In an embodiment, the hollow shaft injection drill bit system (305B) descends then ascends and plunger mixing and/or entrainment of the one or more constituents is accomplished by deployments of one or more subsurface hollow shaft drilling augers (103A).

Figure 5A:
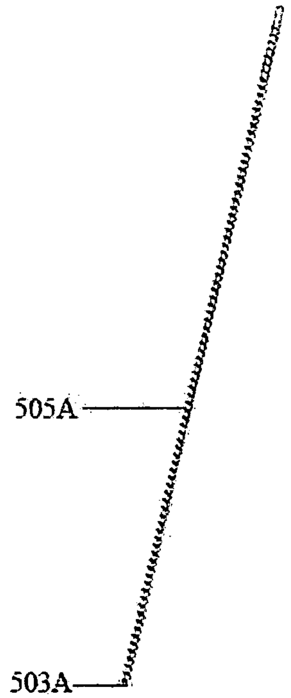
FIG. 5A illustrates a view of an exemplary feeder auger with an attached Stopper, in accordance with at least one embodiment.
Figure 5B:
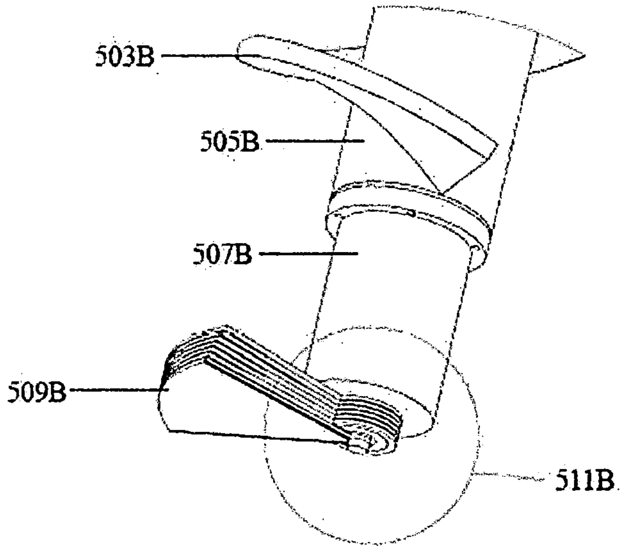
FIG. 5B illustrates a close-up bottom view of FIG. 5A (503A) an exemplary bottom view with the motor casing of feeder stopper not actuated, in accordance with at least one embodiment.
Figure 5C:
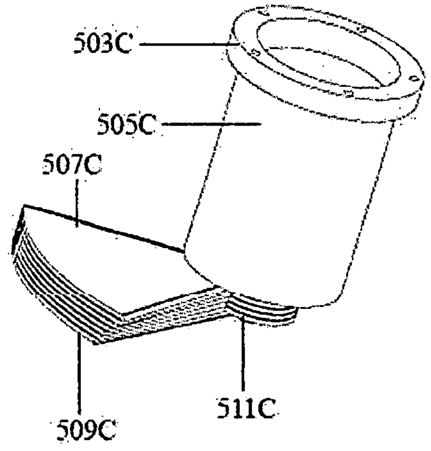
FIG. 5C illustrates a close-up side view of FIG. 5A (503A) an exemplary bottom view with a motor casing of feeder stopper not actuated, in accordance with at least one embodiment.
Figure 5D:
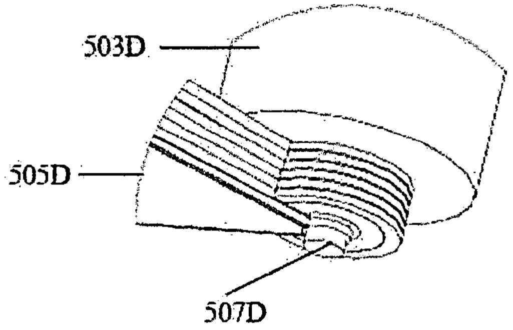
FIG. 5D illustrates an expanded close-up bottom view of FIG. 5B (511B) an exemplary bottom view with the motor casing of feeder stopper not actuated, in accordance with at least one embodiment.

FIG. 5A illustrates a view of an exemplary feeder auger with an attached Stopper, in accordance with at least one embodiment. FIG. 5B illustrates a close-up bottom view of FIG. 5A (503A) an exemplary bottom view with the motor casing of feeder stopper not actuated, in accordance with at least one embodiment. FIG. 5C illustrates a close-up side view of FIG. 5A (503A) an exemplary bottom view with a motor casing of feeder stopper not actuated, in accordance with at least one embodiment. FIG. 5D illustrates an expanded close-up bottom view of FIG. 5B (511B) an exemplary bottom view with the motor casing of feeder stopper not actuated, in accordance with at least one embodiment. FIG. 5A depicts a solid or hollow shaft feeder auger (503A), and a tip of a solid or hollow shaft feeder auger with a plunger (505A). FIG. 5B depicts the rib of a solid or hollow shaft feeder auger (503B), the shaft of a solid or hollow shaft feeder auger (505B), motor and motor housing for plunger (507B), non-deployed plunger panels (509B), call out for close up of FIG. 5C (511B). FIG. 5C depicts a flange of motor for connecting to feeder auger shaft (503C), a motor housing (505C), a top view of non-deployed plunger panels (507C), a bottom of the stack of non-deployed plunger panels (509C), and fastener ring stack of non-deployed plunger panels (511C). FIG. 5D depicts a motor and motor housing for the plunger (503D), a bottom of the stack of non-deployed plunger panels (505D), and a piston (507D).

Figure 2A:
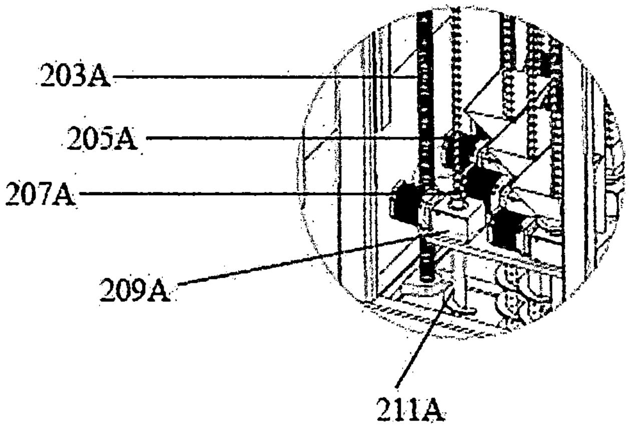
FIG. 2A illustrates a view of an exemplary constituent feeder auger and components, in accordance with at least one embodiment.
Figure 2B:
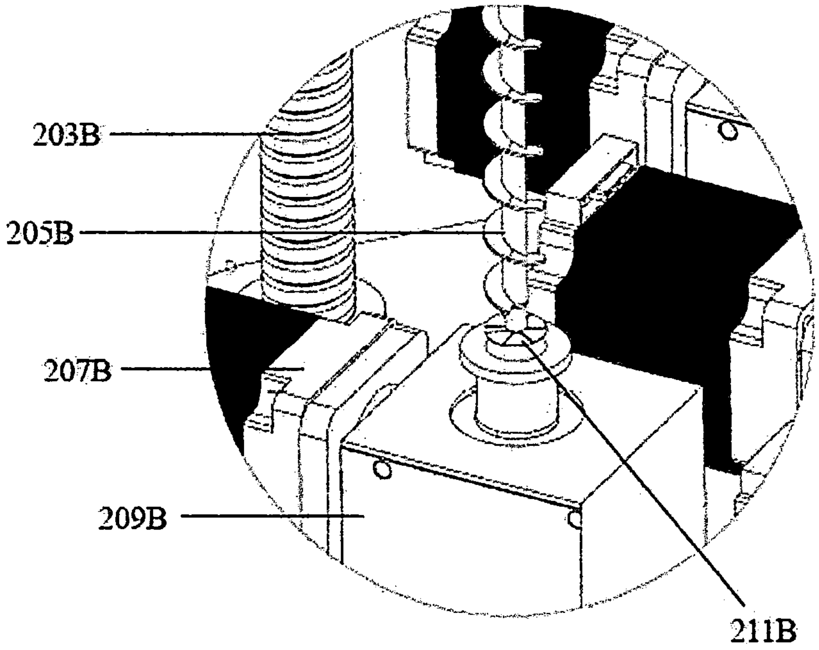
FIG. 2B illustrates a view of an example of a close-up of FIG. 2A with a modular component stopper in a closed position, in accordance with at least one embodiment.

The piston (507D) is configured to be driven by the motor (313B). The piston (507D) is connected to a feeder auger (103C, 105A, 109B, and 205A). FIG. 2A illustrates a view of an exemplary constituent feeder auger and components, in accordance with at least one embodiment. FIG. 2B illustrates a view of an example of a close-up of FIG. 2A with a modular component stopper in a closed position, in accordance with at least one embodiment. FIG. 2A depicts a Sub Surface Hollow Shaft Drilling Augers Platform Lead Screw (203A), Feeder Auger (205A), feeder Auger with Deployed Plunger (207A), call Out for Close Up of FIG. 2B (209A), and Sub Surface Hollow Shaft Drilling Auger (211A). FIG. 2B depicts Sub Surface Hollow Shaft Drilling Augers Platform Lead Screw (203B), Feeder Auger (205B), Sub Surface Hollow Shaft Drilling Auger Motor (207B), Gear Box (209B), and Close Up of Feeder Auger Deployed Plunger (211B).

Figure 4A:
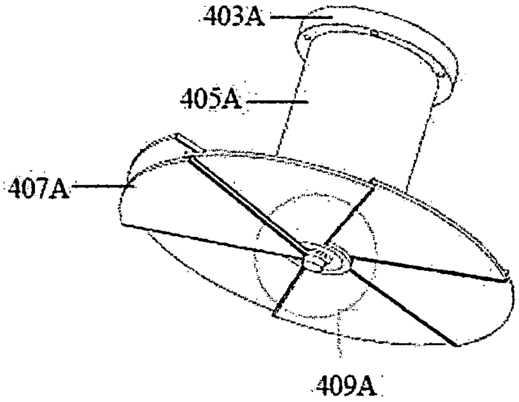
FIG. 4A illustrates a view of an exemplary view of the feeder auger stopper with the last rib being connected to the final panel, in accordance with at least one embodiment.
Figure 4B:
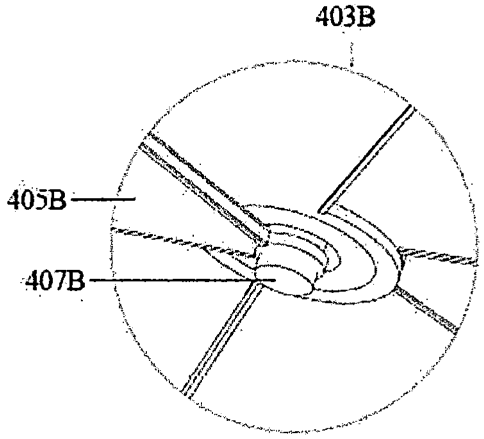
FIG. 4B illustrates a view of an exemplary close-up of bottom panels as seen in FIG. 4A (409A), in accordance with at least one embodiment.
Figure 4C:
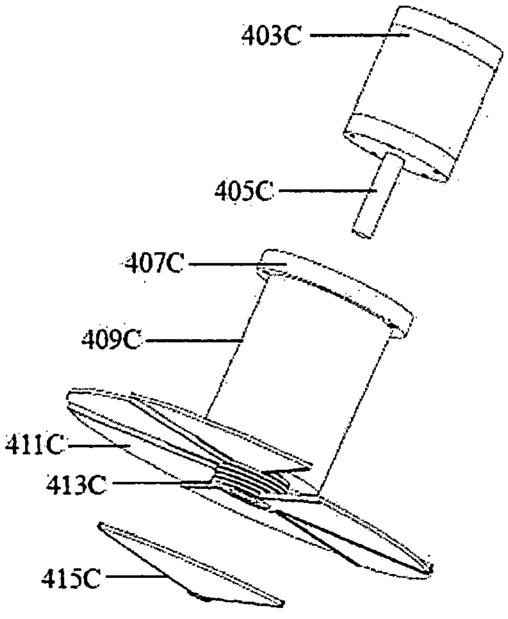
FIG. 4C illustrates an exploded view FIG. 4A of an exemplary Feeder Auger Stopper Assembly, in accordance with at least one embodiment.
Figure 4D:
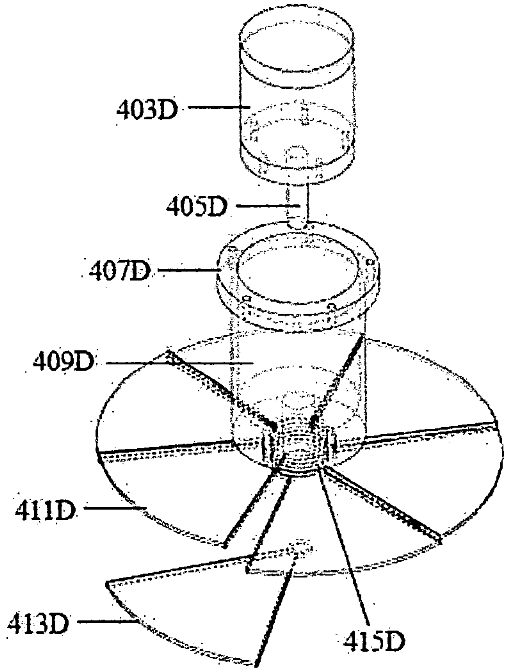
FIG. 4D illustrates an exploded transparent component level view FIG. 4A of an exemplary Feeder Auger Stopper Assembly, in accordance with at least one embodiment.

FIG. 4A illustrates a view of an exemplary view of the feeder auger stopper with the last rib being connected to the final panel, in accordance with at least one embodiment. FIG. 4B illustrates a view of an exemplary close-up of bottom panels as seen in FIG. 4A (409A), in accordance with at least one embodiment. FIG. 4C illustrates an exploded view FIG. 4A of an exemplary Feeder Auger Stopper Assembly, in accordance with at least one embodiment. FIG. 4D illustrates an exploded transparent component level view FIG. 4A of an exemplary Feeder Auger Stopper Assembly, in accordance with at least one embodiment. FIG. 4A depicts a plunger motor housing flange (403A), a Plunger Motor Housing (405A), a plunger panel (407A), and an end of the plunger motor shaft (409A). FIG. 4B depicts call out (403B) of FIG. 4A (409A), a plunger panel (405B), and the end of the plunger motor shaft (407B). FIG. 4C depicts a plunger motor (403C), plunger motor shaft (405C), plunger motor housing flange (407C), plunger motor housing (409C), deployed plunger panel (411C), fastener ring of plunger panel (413C), plunger panel (415C). FIG. 4D depicts a transparent plunger motor (403D), transparent plunger motor shaft (405D), transparent plunger motor housing flange (407D), transparent plunger motor housing (409D), transparent rib connected plunger panel (411D), transparent disconnected plunger panel with ring (413D), and transparent fastener ring of plunger panel (415D).

The plunger motor assembly (403C, 405C, 407C, 409C, 411C, 413C, and 415C) includes a stacked series of panels (505D), and a plurality of motor shafts (311D). The stacked series of panels (505D) has a plurality of ribbed panels (307D) with a rib locking feature. One of the stacked series of the panel (507C) is actuated by the motor (313B). The plurality of motor shafts (311D) has variable lengths to hold the stacked series of panels 505D). The ribbed panels (303C) lock between each other when the ribbed panels (305D, 307B, 307D, and 309B) are spun into a fully formed deployment, wherein the ribbed panels (303C, 305C, and 307C), upon deployment, serve to mix wet and dry materials by one or more subsurface hollow shaft drilling augers (103A) ascending in communication with a feeder auger ascent and the subsequent descent. In an embodiment, the rib locking feature creates a reversible interlocking of the ribbed panels (505D) to form a functional plunger surface piece in a polygonal shape. In an embodiment, the ribbed panels have a length of either shorter than a radius distance of the polygonal shape and/or half of a diagonal distance of the polygonal shape of the hollow shaft or the length matching the radius distance and/or half of the diagonal distance of the polygonal shape of the hollow shaft.

In an embodiment, the ribbed panels include one or more of a plurality of apertures; and a plurality of perforations to facilitate one or more of mixing and entrainment, wherein the plurality of perforations comprising one or more tines (not shown in FIGS.) configured to facilitate the mixing of abrasives. In an embodiment, the tine is a prong that could be part of perforation. In an embodiment, the perforations are sequential in a pattern or irregular to enable one or more of mixing; and entrainment.

In an embodiment, the plunger mixer device (307B, 309B, 311B, and 313B) further comprises one or more AI robots to monitor the depth of the hollow shaft injection drill bit system (305B), wherein the AI robot calculates the resistance by the drill time to achieve the depth. At different depths, lateral perforations may require the deployment of the Plunger to mix and or entrain.

Figure 7:
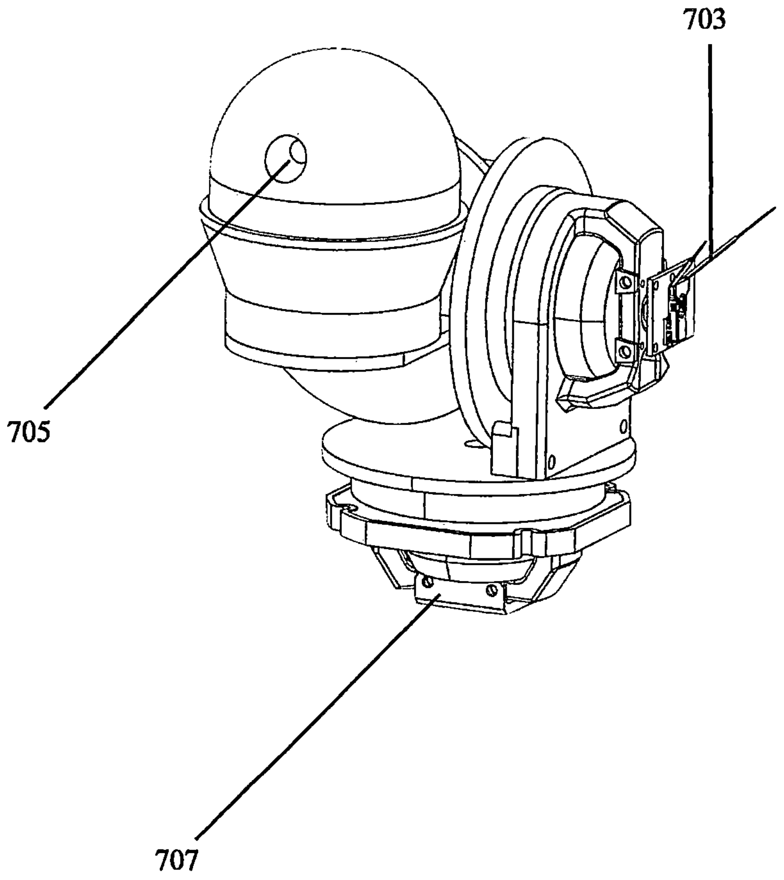
FIG. 7 illustrates a view of an exemplary AI robot, in accordance with at least one embodiment.

FIG. 7 illustrates a view of an exemplary AI robot, in accordance with at least one embodiment. FIG. 7 depicts a Camera Lens (703), Gimbal (705), and Antenna (707). The AI robots include a camera (705) to compute the rib panels and determine depth, wherein the camera enables the AI robots to compute a plurality of revolutions to determine the activation of the plunger mixer device (307B, 309B, 311B, and 313B).

Figure 6A:
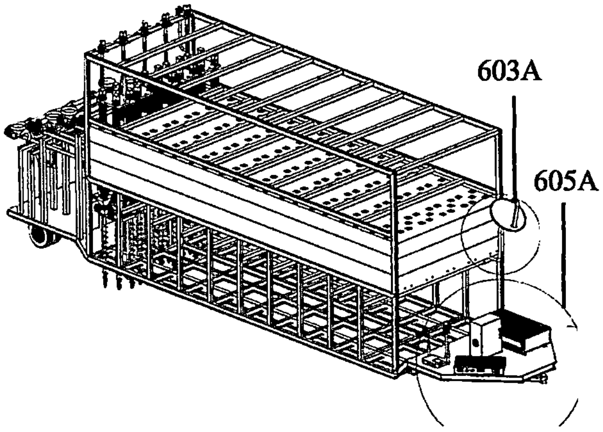
FIG. 6A illustrates a view of an exemplary communications platform of an Injection Drilling Trailer with components seen in FIG. 6B and FIG. 6C, in accordance with at least one embodiment.
Figure 6B:
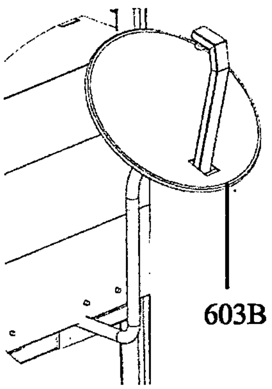
FIG. 6B illustrates a view of an exemplary computer satellite dish, in accordance with at least one embodiment.
Figure 6C:
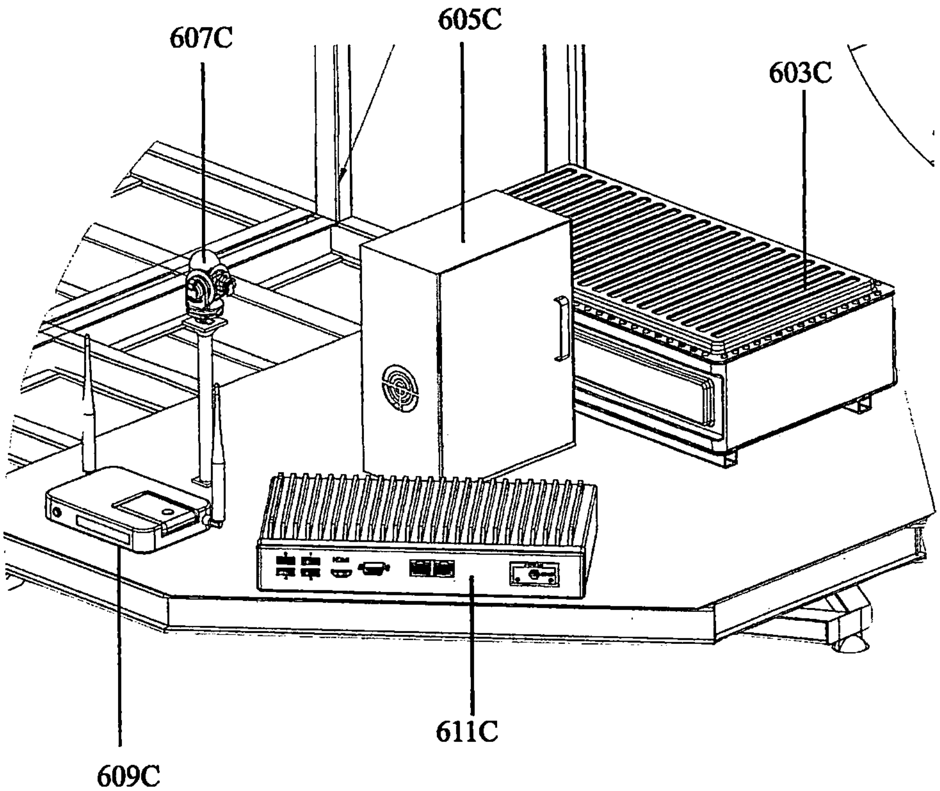
FIG. 6C illustrates a view of an exemplary close-up of Components within the circle of FIG. 6A (605A), in accordance with at least one embodiment.
Figure 9:
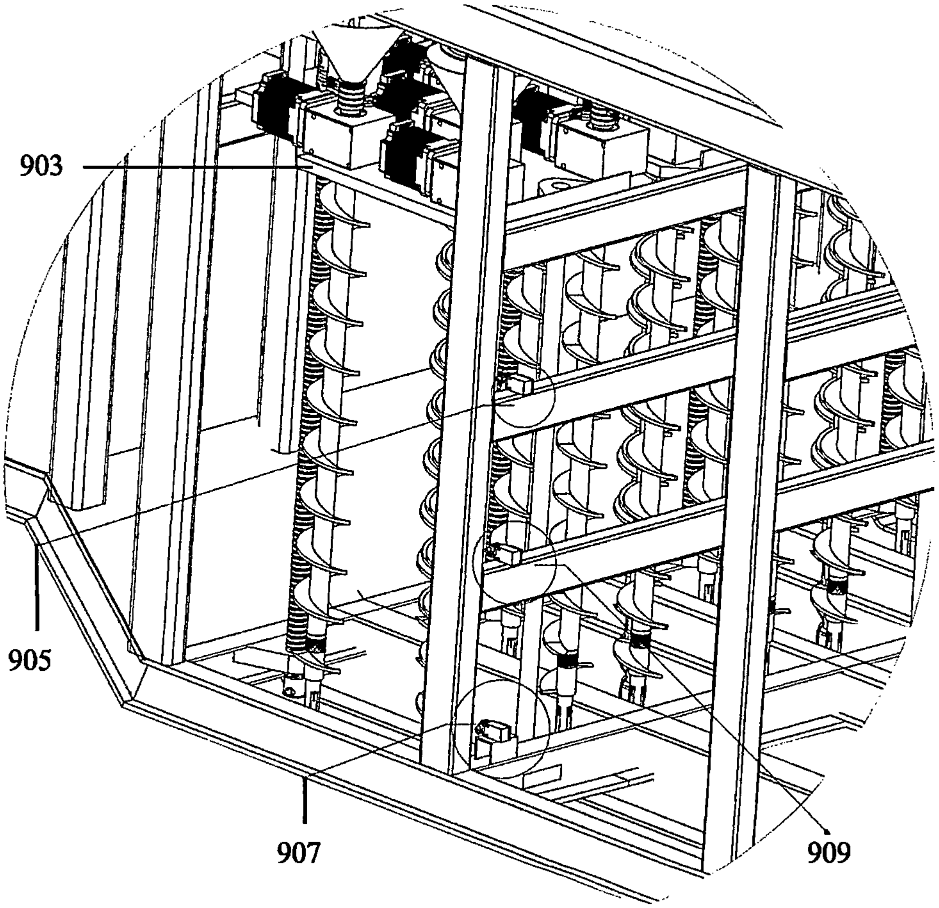
FIG. 9 illustrates a view of an exemplary view of three limit switches, in accordance with at least one embodiment.
Figure 10A:
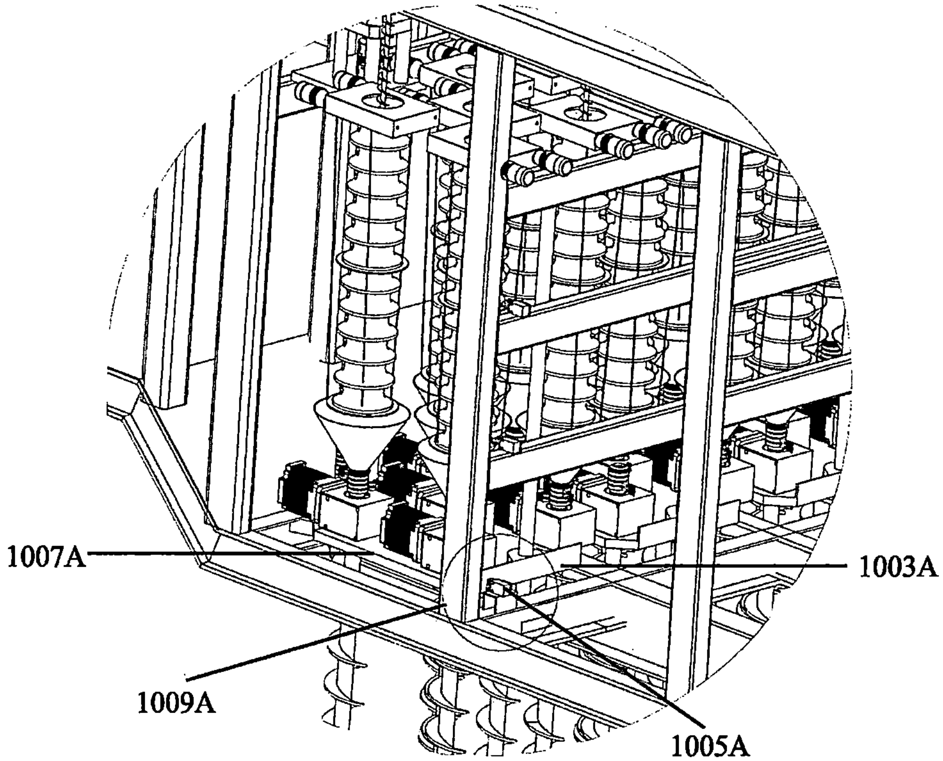
FIG. 10A illustrates a view of an example of a limit switch that has been tripped by the injection drilling array platform having traveled to its limit setting, in accordance with at least one embodiment.
Figure 10B:
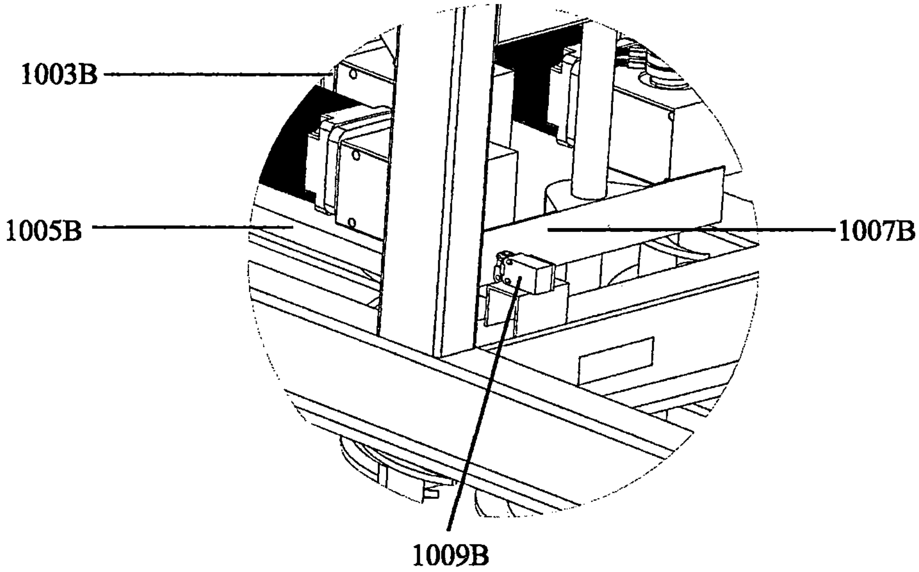
FIG. 10B illustrates a view of an example of a close-up of FIG. 10A.

FIG. 6A illustrates a view of an exemplary communications platform of an Injection Drilling Trailer with components seen in FIG. 6B and FIG. 6C, in accordance with at least one embodiment. FIG. 6B illustrates a view of an exemplary computer satellite dish, in accordance with at least one embodiment. FIG. 6C illustrates a view of an exemplary close-up of Components within the circle of FIG. 6A (605A), in accordance with at least one embodiment. FIG. 6A depicts a Satellite Communications Dish (603A), a communications platform containing components seen in FIG. 6C (605A). FIG. 6B also depicts the Satellite Communications Dish (603B). FIG. 6C depicts a Fuel Cell (603C), PLC (605C), AI Robot (607C), Router (609C), and computer (611C). In an embodiment, the plunger mixer device (307B, 309B, 311B, and 313B) further comprises a plurality of sensors (803A) to measure revolutions connected to a lead screw (803B) and the plurality of sensors (803A, and 803B) to measure distance traveled connected to a drilling platform (903), and one or more microcontrollers (605C, 607C, 611C) and a computer satellite dish (603B) (for cloud computing) to trigger the motor (313B) and measure the distance traveled. In an embodiment, the plurality of prescription of constituents stored in the one or microcontrollers (605C, 607C, 611C). FIG. 9 illustrates an exemplary view of three limit switches, in accordance with at least one embodiment. FIG. 9 depicts an Injection Drill Bit Array Platform (903), Limit Switch (905), Limit Switch (907), and Limit Switch (909). FIG. 10A illustrates a view of an example of a limit switch that has been tripped by the injection drilling array platform having traveled to its limit setting, in accordance with at least one embodiment. FIG. 10B illustrates a view of an example of a close-up of FIG. 10A. FIG. 10A depicts a Back Wall of the Drilling Array Platform (1003A), Limit Switch (1005A), Drilling Array Platform (1007A), and Call Out for Close Up of FIG. 10B (1009A). FIG. 10B depicts a Close Up of FIG. 10A (1003B) and (1009A), a Drilling Array Platform (1005B), a Back Wall of the Drilling Array Platform (1007B), and a Limit Switch (1009B).

Figure 8A:
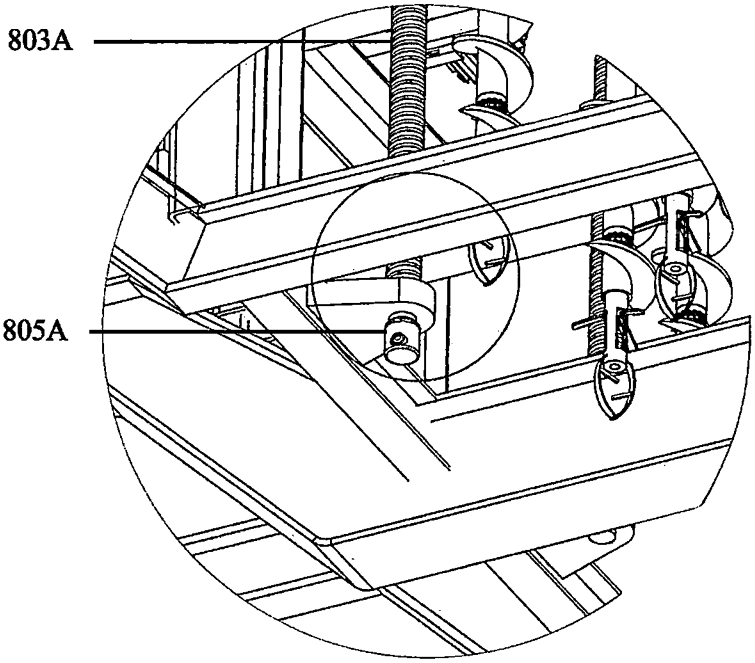
FIG. 8A illustrates a view of an exemplary encoder for lead screw revolution € counting, in accordance with at least one embodiment.
Figure 8B:
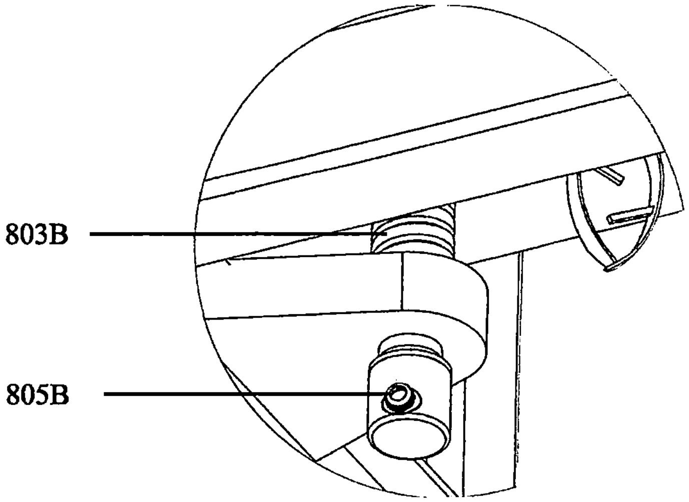
FIG. 8B illustrates a view of an example of a close-up of FIG. 8A and an encoder for lead screw revolution counting, in accordance with at least one embodiment.

FIG. 8A illustrates a view of an exemplary encoder for lead screw revolution Counting, in accordance with at least one embodiment. FIG. 8B illustrates a view of an example of a close-up of FIG. 8A and an encoder for lead screw revolution counting, in accordance with at least one embodiment. FIG. 8A depicts a lead screw (803A), and an encoder (805A). FIG. 8B depicts a Lead Screw (803B), and an encoder (805B). The sensors (803A, and 803B) are configured to determine depth. In an embodiment, the sensors (803A, and 803B) are in communication with a plurality of prescription of constituents at different depths lateral perforations to then command the deployment of the plunger mixer device and/or the plunger mixer device to mix and/or entrain. In an embodiment, the sensors (803A, and 803B) measure soil's moisture and detects or references a ternary database of a soil type to determine the deployment of the plunger mixer device (307B, 309B, 311B, and 313B). In an embodiment, the sensors (803A, and 803B) transmit the measured data to the one or more microcontrollers (605C, 607C, 611C). In an embodiment, the sensors (803A, and 803B) dynamically provide feedback of one or more levels of constituents, nutrients, and or trace elements present in the soil and their levels at specific depths to the one or more processors, and the one or more microcontrollers (605C, 607C, 611C).

In an embodiment, the hollow shaft injection drill bit system can descend then ascend and plunger mixing and/or entrainment of constituents is accomplished during subsurface injections.

The plunger can assist porosity of soil at specific depths by mixing colloids or gels that coat bulk density materials enabling them to more easily exit into the soil via injection, traveling up and down within the hollow shaft by way of full or partially wing deployment.

The plunger can assist in the mitigation of ternary clay soil Smearing by mixing dispensed abrasives within the hollow shaft of the injection drill bit.

Resistance in an augers speed to achieve depth is an indicator of deficits in soil porosity and can trigger the plunger to mix and or blend Constituents to enable enhancement of ternary soil porosity.

To enable prescriptive Plant and Soil needs based on achieved depth and the need for natural biological solutions for pest control, surfactants that can be by way of example and not limitation mixing or creating gels, viscous solutions, and or emulsions with fungi spores can be mixed before ejection at specific depths and or dispatched at the surface.

Plunger Mixing solutions can include insect food at specific depths this food is tainted with Biologicals by way of illustration and not limited to fungi that may be natural enemies to pests but not to good insects that do not harm plants life. Insects can be fed the blended material and their bodies can carry by transfer of viscosity to body parts to plants and plant leaves of Constituents that are non-harmful to human life but poison to pests. Once transferred by way of illustration and not limited to these materials when consumed by targeted pests such as treehoppers will become infected and die. The plungers shaft can be heated and panels can transfer heat to the solution.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms enclosed. On the contrary, the intention is to cover all modifications, alternative constructions, and equivalents falling within the spirit and scope of the invention, as defined in the appended claims. Thus, it is intended that the present invention cover the modifications and variations of this invention, provided they are within the scope of the appended claims and their equivalents.

FIG. 1A

#103A Sub Surface Hollow Shaft Drilling Augers
#105A Feeder Augers for Sub Surface Hollow Shaft Drilling Augers

FIG. 1B

#103B Sub Surface Hollow Shaft Drilling Auger Motor
#105B Sub Surface Hollow Shaft Drilling Augers
#107B Sub Surface Hollow Shaft Drilling Augers Platform Lead Screw
#109B Feeder Augers
#111B Hopper

FIG. 1C

#103C Feeder Auger
#105C Sub Surface Hollow Shaft Drilling Augers Platform Lead Screw
#107C Hopper
#109C Non-Deployed Feeder Auger Plunger

FIG. 2A

#203A Sub Surface Hollow Shaft Drilling Augers Platform Lead Screw
#205A Feeder Auger
#207A Feeder Auger with Deployed Plunger
#209A Call Out for Close Up of FIG. 2B
#211A Sub Surface Hollow Shaft Drilling Auger

FIG. 2B

#203B Sub Surface Hollow Shaft Drilling Augers Platform Lead Screw
#205B Feeder Auger
#207B Sub Surface Hollow Shaft Drilling Auger Motor
#209B Gear Box
#211B Close Up of Feeder Auger Deployed Plunger

FIG. 3A

#303A Shaft of Hollow Feeder Auger
#305A Call Out for Close Up of FIG. 3B

FIG. 3B

#303B Feeder Auger Rib #305B Hollow Feeder Auger Shaft
#307B Plunger Panel Rib in Un-Locked Position
#309B Plunger Panel
#311B Call-Out for Close Up in FIG. 3C A Stopper or Plunger Panel Rib in Locked Position
#313B Plunger Motor

FIG. 3C

#303C Plunger Panel Rib
#305C Top of Flat Plunger Panel
#307C Perimeter Depth of Panel

FIG. 3D

#303D Flange of Motor Housing
#305D Plunger Panel
#307D Plunger Panel Rib
#309D Ring Fastener Plunger Panel
#311D Motor Housing Shaft Interface to Plunger Panels

FIG. 4A

#403A Plunger Motor Housing Flange
#405A Plunger Motor Housing
#407A Plunger Panel
#409A End of Plunger Motor Shaft

FIG. 4B

#403B Call Out of FIG. 4A #409A
#405B Plunger Panel
#407B End of Plunger Motor Shaft

FIG. 4C

#403C Plunger Motor
#405C Plunger Motor Shaft
#407C Plunger Motor Housing Flange
#409C Plunger Motor Housing
#411C Deployed Plunger Panel
#413C Fastener Ring of Plunger Panel
#415C Plunger Panel

FIG. 4D

#403D Transparent Plunger Motor
#405D Transparent Plunger Motor Shaft
#407D Transparent Plunger Motor Housing Flange
#409D Transparent Plunger Motor Housing
#411D Transparent Rib Connected Plunger Panel
#413D Transparent Disconnected Plunger Panel With Ring
#415D Transparent Fastener Ring of Plunger Panel

FIG. 5A

#503A Solid or Hollow Shaft Feeder Auger
#505A Tip of Solid or Hollow Shaft Feeder Auger with Plunger

FIG. 5B

#503B Rib of Solid or Hollow Shaft Feeder Auger
#505B Shaft of Solid or Hollow Shaft Feeder Auger
#507B Motor and Motor Housing for Plunger
#509B Non-Deployed Plunger Panels
#511B Call Out for Close Up of FIG. 5C

FIG. 5C

#503C Flange of Motor for connecting to Feeder Auger Shaft
#505C Motor Housing
#507C Top View of Non-Deployed Plunger Panels
#509C Bottom of Stack of Non-Deployed Plunger Panels
#511C Fastener Ring Stack of Non-Deployed Plunger Panels

FIG. 5D

#503D Motor and Motor Housing for Plunger
#505D Bottom of Stack of Non-Deployed Plunger Panels
#507D Piston

FIG. 6A

#603A Satellite Communications Dish
#605A Communications Platform containing components seen in FIG. 6C

FIG. 6B

#603B Satellite Communications Dish

FIG. 6C

#603C Fuel Cell
#605C PLC
#607C AI Robot
#609C Router
#611C Computer

FIG. 7

#703 Camera Lens
#705 Gimbal
#707 Antenna

FIG. 8A

#803A Lead Screw
#805A Encoder

FIG. 8B

#803B Lead Screw
#805B Encoder

FIG. 9

#903 Injection Drill Bit Array Platform
#905 Limit Switch
#907 Limit Switch
#909 Limit Switch

FIG. 10A

#1003A Back Wall of Drilling Array Platform
#1005A Limit Switch
#1007A Drilling Array Platform
#1009A Call Out for Close Up of FIG. 10B

FIG. 10B

#1003B Close Up of FIG. 10A and #1009A
#1005B Drilling Array Platform
#1007B Back Wall of Drilling Array Platform
#1009B Limit Switch

The invention claimed is:

1. A hollow shaft injection drill bit system, comprising:
- a plunger mixer device;
- a hollow shaft injection drill bit;
- a motor connected to a tip of a feeder auger;
- a piston configured to be driven by the motor, wherein the piston is connected to the feeder auger;
- wherein the plunger mixer device comprises a plunger motor assembly, comprising:
- a stacked series of panels having a plurality of ribbed panels with a rib locking feature, wherein the stacked series of panels is actuated by the motor;
- wherein the hollow shaft injection drill bit system comprises a plurality of motor shafts having variable lengths;
- wherein one of the motor shafts of the plurality of motor shafts holds the stacked series of panels,
- wherein the plurality of ribbed panels lock between each other when the plurality of ribbed panels are spun into a fully formed deployment,
- wherein the plurality of ribbed panels, upon deployment of the plunger mixer device, serve to mix wet and dry materials upon an ascent of the feeder auger and a subsequent descent of the feeder auger.

2. The hollow shaft injection drill bit system as claimed in claim 1, wherein the rib locking feature creates a reversible interlocking of the plurality of ribbed panels to form a functional plunger surface piece in a round shape.

3. The hollow shaft injection drill bit system as claimed in claim 1, wherein the plunger mixer device deploys one or multiple times upon the ascent of the feeder auger to push the materials out of the hollow shaft injection drill bit system.

4. The hollow shaft injection drill bit system as claimed in claim 1, wherein the feeder auger descends then ascends such that constituents, nutrients, and/or trace elements are mixed and/or entrained at varying depths.

5. The hollow shaft injection drill bit system as claimed in claim 1 further comprises one or more AI robots to monitor a depth of the hollow shaft injection drill bit system, wherein the AI robot calculates a resistance by a drill time to determine the depth.

6. The hollow shaft injection drill bit system as claimed in claim 5, wherein the one or more AI robots comprise a camera, wherein the camera enables the one or more AI robots to compute a plurality of revolutions of the plurality of ribbed panels and determine a state of activation of the plunger mixer device.

7. The hollow shaft injection drill bit system as claimed in claim 1 further comprises:
- a plurality of sensors connected to a lead screw and drilling platform, the plurality of sensors are configured to measure revolutions and distance traveled, and
- one or more microcontrollers and a computer satellite dish (for cloud computing), the one or more microcontrollers configured to activate the motor and cooperate with at least one of the plurality of sensors to measure the distance traveled.

8. The hollow shaft injection drill bit system as claimed in claim 7, wherein the at least one of the plurality of sensors are configured to determine depth.

9. The hollow shaft injection drill bit system as claimed in claim 8, wherein the one or more microcontrollers cooperate with the at least one of the plurality of sensors to dispense constituents at different depths by activating the plunger mixer device to mix and/or entrain the constituents at a selected one of the different depths.

10. The hollow shaft injection drill bit system as claimed in claim 9, wherein prescriptive constituents are stored in the one or more microcontrollers.

11. The hollow shaft injection drill bit system as claimed in claim 9, wherein the motor has a variable speed depending on the constituents, wherein the variable speed creates entrainment of the constituents.

12. The hollow shaft injection drill bit system as claimed in claim 7, wherein another one of the plurality of sensors measure soil moisture and references a ternary database of a soil type to control the deployment of the plunger mixer device.

13. The hollow shaft injection drill bit system as claimed in claim 12, wherein the another one of the plurality of sensors transmit measured data to the one or more microcontrollers.

14. The hollow shaft injection drill bit system as claimed in claim 12, wherein the another one of the plurality of sensors dynamically provide feedback of one or more levels of constituents, nutrients, and/or trace elements present in a soil and their levels at specific depths to the one or more microcontrollers.

15. The hollow shaft injection drill bit system as claimed in claim 14, wherein constituents, nutrients, and/or trace elements are mixed within the hollow shaft injection drill bit by the plunger mixer device.

16. The hollow shaft injection drill bit system as claimed in claim 14, wherein the plunger mixer device spins in one of the same direction as the feeder auger, an opposite direction of the feeder auger, a first direction while the feeder auger remains still, and a second direction opposite the first direction while the feeder auger remains still.

* * * * *